(12) United States Patent
Singleton

(10) Patent No.: US 12,486,634 B2
(45) Date of Patent: *Dec. 2, 2025

(54) PREFABRICATED VERTICAL GEOTEXTILE DITCH CHECK SYSTEM

(71) Applicant: Mazcon, A Kurtz Bros. Company, LLC, Covington, GA (US)

(72) Inventor: Earl R. Singleton, Oxford, GA (US)

(73) Assignee: Mazcon, A Kurtz Bros. Company, LLC, Covington, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/768,589

(22) Filed: Jul. 10, 2024

(65) Prior Publication Data
US 2024/0360640 A1    Oct. 31, 2024

Related U.S. Application Data

(63) Continuation of application No. 17/866,862, filed on Jul. 18, 2022, now Pat. No. 12,060,690.

(Continued)

(51) Int. Cl.
*E02D 17/20*       (2006.01)
*E02B 8/02*        (2006.01)
(Continued)

(52) U.S. Cl.
CPC .......... *E02D 17/202* (2013.01); *E02B 8/023* (2013.01); *E02B 11/00* (2013.01); *E03F 1/00* (2013.01);
(Continued)

(58) Field of Classification Search
CPC ........ E02D 17/202; E02B 3/023; E02B 3/12; E02B 3/122; E02B 3/127; E02B 7/005; E02B 8/02; E02B 8/023

See application file for complete search history.

(56) References Cited

U.S. PATENT DOCUMENTS

| 3,739,913 A | 6/1973 | Bogosian |
| 4,279,535 A | 7/1981 | Gagliardi et al. |

(Continued)

FOREIGN PATENT DOCUMENTS

KR     20090114292 A     11/2009

OTHER PUBLICATIONS

Profile Products Llc; Terra-Tubes; Fiber Filtration Tubes; Brochure Jun. 2007.

(Continued)

*Primary Examiner* — Frederick L Lagman
(74) *Attorney, Agent, or Firm* — Adams & Reese LLP

(57) ABSTRACT

A ditch check system and methods for storm water control are provided. The ditch check system can include a velocity-restricting component of geotextile fabric with one or more porosities configured to control velocities of storm water flows for sediment control and silt retention. The velocity-restricting component can have one or more reinforcing elements to provide additional support against tearing and/or undue movement, as well as attachment points for fastening the fabric to support members. The ditch check system can further include a front water seal and a rear scour guard attached to the velocity-restricting component, and which are substantially impermeable to vertical water flow to inhibit ditch scouring and prevent the flow of storm water under the ditch check system. To facilitate transportation, installation, and assembly, one or more of the components of the ditch check system can be supplied as a pre-assembled package.

13 Claims, 10 Drawing Sheets

Related U.S. Application Data

(60) Provisional application No. 63/228,416, filed on Aug. 2, 2021.

(51) Int. Cl.
    *E02B 11/00*    (2006.01)
    *E03F 1/00*     (2006.01)
    *E02D 31/06*    (2006.01)

(52) U.S. Cl.
    CPC ...... *E02D 31/06* (2013.01); *E02D 2300/0085* (2013.01)

(56) References Cited

U.S. PATENT DOCUMENTS

| | | | |
|---|---|---|---|
| 4,756,511 A | 7/1988 | Wright, III |
| 5,108,224 A | 4/1992 | Cabaniss et al. |
| 5,348,419 A | 9/1994 | Bailey et al. |
| 5,431,991 A | 7/1995 | Quantrille et al. |
| 5,605,416 A | 2/1997 | Roach |
| 5,735,640 A | 4/1998 | Meyer et al. |
| 5,758,868 A | 6/1998 | Shea |
| 5,877,096 A | 3/1999 | Stevenson et al. |
| 5,948,250 A | 9/1999 | Middleton |
| 5,954,451 A | 9/1999 | Presby |
| 6,010,622 A | 1/2000 | Chinn |
| 6,041,944 A | 3/2000 | Meier |
| 6,169,045 B1 | 1/2001 | Pike et al. |
| 6,464,428 B1 | 10/2002 | Mikell |
| 6,527,477 B1 | 3/2003 | Allard |
| 6,558,075 B2 | 5/2003 | Benedict et al. |
| 6,616,383 B2 | 9/2003 | Janz |
| 6,641,335 B1 | 11/2003 | Allard |
| 6,709,579 B1 | 3/2004 | Singleton et al. |
| 6,722,817 B2 | 4/2004 | Benedict et al. |
| 7,029,208 B1 | 4/2006 | Santha |
| 7,074,326 B2 | 7/2006 | Singleton |
| 7,157,010 B1 | 1/2007 | Wolfe |
| 7,303,084 B2 | 12/2007 | McPhillips |
| 7,449,105 B2 | 11/2008 | Hastings |
| 7,465,129 B2 | 12/2008 | Singleton |
| 7,811,028 B1 | 10/2010 | De la Rosa et al. |
| RE42,695 E | 9/2011 | Singleton |
| 8,465,231 B2 | 6/2013 | Christopher |
| 8,747,027 B1 | 6/2014 | Singleton |
| 10,145,080 B2 | 12/2018 | Segroves et al. |
| 10,253,474 B2 | 4/2019 | Allard |
| 10,280,578 B2 | 5/2019 | Santha |
| 11,117,075 B2 | 9/2021 | Zock |
| 11,384,492 B2 | 7/2022 | Schaaf |
| 11,466,421 B2 | 10/2022 | Powell |
| 12,060,690 B2 * | 8/2024 | Singleton ............. E02D 17/202 |
| 2001/0052595 A1 | 12/2001 | Hulett |
| 2002/0172564 A1 | 11/2002 | Brown |
| 2003/0159342 A1 | 8/2003 | Ruiz et al. |
| 2006/0133897 A1 | 6/2006 | Allard et al. |
| 2006/0133900 A1 | 6/2006 | Singleton |
| 2007/0069191 A1 | 3/2007 | Arnold et al. |
| 2008/0112766 A1 | 5/2008 | Kerman |
| 2008/0157044 A1 | 7/2008 | Barfield |
| 2009/0095946 A1 | 4/2009 | Bazzell |
| 2010/0248574 A1 | 9/2010 | King et al. |
| 2011/0229275 A1 | 9/2011 | Winings |
| 2011/0305530 A1 | 12/2011 | Hunt |
| 2016/0298311 A1 | 10/2016 | Green |
| 2017/0204582 A1 | 7/2017 | Allard |
| 2019/0055706 A1 | 2/2019 | Santha |
| 2019/0145068 A1 | 5/2019 | Zock et al. |
| 2019/0176059 A1 | 6/2019 | Zock |
| 2019/0352867 A1 | 11/2019 | Schaaf |
| 2021/0180281 A1 | 6/2021 | Powell |
| 2023/0035252 A1 | 2/2023 | Singleton |

OTHER PUBLICATIONS

Amoco; Product Specification for Amoco Style 2130, issued May 21, 1999.

Geotex, "Geotextiles for Sediment Control" Specification sheet for "Silt Fence".

* cited by examiner

PREFABRICATED VERTICAL GEOTEXTILE DITCH CHECK SYSTEM

CROSS REFERENCE TO RELATED APPLICATION

The present Patent Application is a continuation of previously filed U.S. patent application Ser. No. 17/866,862, filed Jul. 18, 2022, now U.S. Pat. No. 12,060,690, issued on Aug. 13, 2024, titled "PREFABRICATED VERTICAL GEOTEXTILE DITCH CHECK SYSTEM", which priority is hereby claimed to the filing date of U.S. Provisional Patent Application No. 63/228,416, filed Aug. 2, 2021, titled "PREFABRICATED VERTICAL GEOTEXTILE DITCH CHECK SYSTEM."

INCORPORATED BY REFERENCE

U.S. patent application Ser. No. 17/866,862, filed Jul. 18, 2022 and U.S. Provisional Patent Application No. 63/228,416, filed Aug. 2, 2021, are specifically incorporated by reference herein as if sent forth in their entireties.

TECHNICAL FIELD

The present disclosure relates generally to storm water control systems and applications, and in particular to systems configured to control velocities of storm water flows for sediment control and silt retention.

BACKGROUND

Sediment has been recognized as one of the most significant water quality impairments in the United States. Historically, soil erosion was primarily considered an agricultural issue, but more recently, construction sites have received increased attention as more land is being developed and there is greater awareness of water quality issues. Control of storm water runoff is important to prevent dirt, debris and other contaminants from entering lakes, rivers and other water sources. Further, there are a number of environmental protection regulations relating to the control of storm water, particularly with regard to control of runoff construction sites such as along roadways, during new building constructions, housing and office developments, etc.

Silt fences and erosion barriers traditionally have become commonly used for erosion and sediment control applications being used in the field to reduce soil loss from construction, residential and agricultural sites. Such silt fences are designed to help retard storm water runoff and to filter silt, sediment and debris from the fluid as it flows away from a development site. Often, as larger particles block the pores in the silt fence, sediment or debris is collected and builds up against the fence, which can cause the storm water runoff to pool or "pond" behind the fence, promoting sedimentation.

In some applications, such as along drainage ditches, graded construction sites, or other similar contoured areas that direct water toward a central flow path, the sloping sides of such drainage ditches can make traditional silt fences and check dams difficult to install with a substantially complete seal. Resulting issues with controlling high volumes and velocities of storm water flows can lead to undesirable leaks and passage of sediment therethrough.

Accordingly, it is recognized there is a desire for a cost-effective prefabricated system to control of the velocities of storm water flows such as along drainage ditches and other contoured or sloped drainage areas. The present disclosure may address one or more of the above-referenced considerations, as well as possibly others.

SUMMARY

Briefly described, according to one aspect, the present disclosure is directed to ditch check systems, kits and methods of forming and installing such ditch check systems. In embodiments, the ditch check systems can include a series of components configured to substantially track or align with the contours of sloped or angled storm water runoff areas such as storm water ditches, so as to provide a barrier that protects against silt and debris from flowing thereunder or along the sides of the sloped or angled runoff areas, control of a velocity of storm water, trap the sediment displaced by ditch scouring, pooling and release of ditch bottom concentrated flow through a vertical filter component as horizontal sheet flow, and have the structural integrity to withstand buildup of sediment, silt, and/or pooling of increased volumes of water such as during periods of heavy rain, flooding, or other incidents of high storm water runoff. Other features, advantages, and aspects also are described.

According to various aspects of the present disclosure, the ditch check systems generally can comprise a prefabricated vertical geotextile ditch check system. The ditch check system can be provided as a substantially modular kit of individual or pre-assembled components. In embodiments, components can include a vertical velocity restricting component of water-permeable material, that is configured to filter sediment and debris from a storm water flow. The vertical velocity restricting component can be configured to follow and conform to the sloping terrain of the storm water ditch so as to be relatively easy and inexpensive to incorporate and seal within typical ditch geometries.

The vertical velocity-restricting component can comprise a top edge, a bottom edge, and a fabric sheet or body having a selected or varying porosity for filtering storm water flows, a first or front water seal and a second or rear scour guard coupled to or integrated with the velocity-restricting component. In some examples, an extended scour guard can be provided along the rear or second scour guard attached to the velocity-restricting component.

In embodiments, the body of the fabric sheet of the vertical velocity-restricting component can be formed from a woven filtering or geotextile material, e.g., a spun bound polypropylene, polyester, or similar flexible and water-permeable polymeric materials. Alternatively, in other embodiments, other filtering materials, such as knitted, layered, needle-punched, non-woven or fibrous mat materials, or combinations thereof can be used. In embodiments, the sheet can have a range of porosities, and can include one or more sheets having varying porosities defined along a width/height thereof, and define flow zones or storm water release stages configured to allow varying amounts of water volumes to pass therethrough depending on water levels, while substantially preventing silt and debris from passing through. The sheet further can have regions of increased denier per thickness and/or reinforcing bands or elements to provide load support and connection areas for fasteners to connect the sheet to vertical stakes as ground supports. In some embodiments, the water-permeable materials of the velocity restricting component can have an apparent opening size (AOS) in a range from approximately 20-70 sieve. In some embodiments, the water-permeable materials can comprise a non-woven fabric having an apparent opening size in of approximately 30-70 sieve. In other embodiments, the water-permeable materials can have an apparent opening size of approximately 20-60 sieve, 20-50 sieve, 20-40 sieve, 20-30 sieve, 30-60 sieve, 30-50 sieve, 30-40 sieve, 40-70 sieve, 40-60 sieve, 40-50 sieve, 50-70 sieve, 50-60 sieve, or 60-70 sieve. In other embodiments, the water permeable materials can compromise other types of materials, including woven, needle-punched or other permeable materials and can have apparent opening sizes.

In some examples, a lower portion of the velocity restricting component can have an angled or curved configuration relative to upper portions of the sheet and can included one or more angled portions that can be configured to serve as a channel for engaging ground cover.

The first or front water seal can extend upstream from the lower end of the velocity restricting component at ground level, and the second or rear scour guard can extend downstream from the lower end at ground level for collecting sedimentation and limit ditch scouring. In some examples, the front water seal can include a sealing material that can extend to the front of a lower portion of the vertical fabric sheet, and can be configured to substantially block or deter storm water from passing or pooling underneath the system. Similarly, the rear guard can include a sealing material located and extending rearward at or near ground level. The front and rear guards also can be configured to substantially limit soil migration such that the position of the ditch check system components remain generally static and/or fixed in place within the ditch and are not compromised by the forces of storm water flow.

In some examples, the ditch check system further can include at least one compression tube extending along a lower end of the velocity-restricting component. The at least one compression tube can have, for example, individual lateral sections of various sizes and lengths depending on the ditch dimensions and desired flow characteristics. A plurality of compression stakes can be located at spaced intervals along the compression tube or tubes, assembled and secured as needed to provide a downward force on the compression tubes sufficient to resist migration of the tubes upon impact or sustained loading from the storm water flow.

To facilitate transportation, installation, and assembly, one or more of the components of the ditch check system can be supplied as a pre-assembled package, and multiple such packages can be staged along the length of the same drainage ditch for improved flow management. For example, the compression tubes, vertical flow restricting component, front water seal, and rear scour guard can be supplied as a prefabricated unit.

In other embodiments, each of the compression stakes can include a stake portion configured to penetrate through the compression tubes into a portion of the soil therebelow. The compression stakes can also have a compression pin received in and extending substantially horizontally (e.g., in applications, approximately parallel to ground level) through the stake portion. The compression pins contact the compression tubes when the compression stakes are driven into the soil, such that a downward force is exerted to substantially fix the location of the compression tubes relative to the velocity-restricting component.

In another aspect, a ditch check system for controlling flow volumes and velocities in a storm water ditch can have a contoured vertical velocity-restricting component. The velocity-restricting component can have multiple segments of one or more water-permeable materials of differing deniers and/or porosities and will be configured to filter sediment and debris from a storm water flow. In one example, the segments of the water-permeable materials can be made up of geotextile fabrics can be coupled, connected or integrated together, and can have an apparent opening size of about 20-70 sieve. In another example, the segments of geotextile fabrics having a mesh opening sizes within a range of varying sizes can be used.

The porosities of the segments of the velocity-restricting component can vary in multiple directions. In one example, a porosity can be varied in among the segments progressing from the center of the storm water ditch up the slope of the ditch sides to control/vary the amount and/or velocities of storm water released through differing lateral segments. In another example, the porosities vary can be varied in a vertical direction of the velocity-restricting component to create different release stages, including one or more the active release stages depending on the height of the water flow passing through the velocity-restricting component. Lower portions or a lower edge of the velocity restricting component can have an angled or curved shape in cross section that can have a configuration substantially matching angled or sloped sides of the drainage area.

In some embodiments, the velocity-restricting component can have a series of vertical stakes attached at spaced intervals along the velocity-restricting component. The stakes can be driven into the soil to secure the velocity-restricting component in place. The spacing of the stakes can be such that a first spacing between stakes in one or more outer lateral segments of the sheet located in a position spread from the central channel of the storm water ditch can be greater than a second spacing between stakes along a more central segment of the sheet.

The ditch check system can have a front water seal connected approximate a lower end of and extending upstream to the velocity-restricting component. A rear scour guard can similarly connect approximate the lower and of the sheet and can extend opposite the front water seal in the downstream direction. The front water seal and the rear scour guard can be constructed of a material that is substantially impermeable to vertical water flow to inhibit ditch scouring. Additionally, the front water seal can prevent through flow of storm water under the velocity restricting component from undermining or otherwise impacting the integrity of the ditch check system.

To facilitate transportation and installation, the velocity-restricting component, front water seal, and rear scour guard can be supplied attached together to form a prefabricated or integrated assembly. The assembly can be shaped to conform and track with the sloping terrain of a storm water ditch, such that the velocity-restricting component follows the sloping sides of the ditch and the vertical stakes are more densely spaced towards the center of the sheet.

A plurality of compression tubes can be provided to form a barrier along a lower portion of the velocity restricting component, e.g., along one or both sides thereof. The compression tubes can help protect the ditch check system from water pooling around or passing under the velocity-restricting component. A plurality of compression stakes can be used to secure the compression tubes and anchor in the soil upstream of the sheet.

In other aspects, embodiments of ditch check systems and methods for installation thereof along a drainage ditch or the like according to the principles of the present disclosure are provided. For example, a method for installing a ditch check system can include installing or erecting a velocity-restricting component along/within a storm water ditch contoured with a central longitudinal channel for flow. For example, the central channel can be at the vertex of a v-shaped ditch.

A vertical velocity-restricting component can be installed across the storm water ditch to substantially follow the sloping sides of the ditch. The velocity-restricting component can have a plurality of release stages arranged at different vertical heights and/or lateral positions therealong, and each of the release stages can allow a different flow rate of storm water to pass therethrough. A series of weighted compression tubes can be located laterally in front of the velocity-restricting component and can extend along the length of the vertical-restricting component.

The method can include the step of positioning a front water seal connected to the velocity-restricting component at ground level and extending upstream from a lower portion of the sheet. In some instances, a trench can be excavated just upstream from where the sheet will be positioned. The trench can act as a depression into which the front water seal and one or more compression tubes can be placed. The edges of the front water seal can then be secured along the storm water ditch using pins, stakes, or other suitable fastening or securing devices.

Similarly, a rear scour guard can be attached to the velocity-restricting component and extend downstream opposite the front water seal at ground level. To further protect the soil below, an extended scour guard can be provided as part of the rear scour guard; or can be provided as an additional component and can be positioned at ground level downstream of the rear scour guard. The trailing edge of the rear scour guard can overlap with the leading edge of the extended scour guard to prevent water from penetrating the interface. Alternatively, at least a portion of the rear scour guard and/or extended scour guard can be secured using pins, stakes or other suitable fastening or securing devices. The edges around the perimeters of the rear scour guard, and extended scour guard if utilized, can then be secured in place similar to the front water seal.

In some examples, at least the velocity-restricting component, front water seal, and rear scour guard can be supplied as an integrated, pre-assembled unit or system package. In this configuration, the method can involve positioning the unit and each of its components together along a storm water ditch and arranging the front water seal and the rear scour guard as previously described.

The series of compression tubes can be anchored in place with a plurality of compression stakes at various intervals along the side of a trench so as to prevent migration of the compression tubes in response to storm water flows bearing thereagainst. The compression stakes can pass through the compression tubes and front water seal and exert a downward force on the tubes using dowel rods or pins extending horizontally through the stakes.

The foregoing and other advantages and aspects of the embodiments of the present disclosure will become apparent and more readily appreciated from the following detailed description, taken in conjunction with the accompanying drawings. Moreover, it is to be understood that both the foregoing summary of the disclosure and the following detailed description are exemplary and intended to provide further explanation without limiting the scope of the present disclosure.

BRIEF DESCRIPTION OF THE DRAWINGS

The accompanying drawings, which are included to provide a further understanding of the embodiments of the present disclosure, are incorporated in and constitute a part of this specification, illustrate embodiments of this disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced. According to common practice, the various features of the drawings discussed below are not necessarily drawn to scale. Additionally, dimensions of various features and elements in the drawings may be expanded or reduced to more clearly illustrate embodiments of the disclosure.

DETAILED DESCRIPTION

The embodiments of the present disclosure will now be described in more detail with reference to the attached drawing figures, and without limitation, the present disclosure is directed to a ditch check system to slow the velocity of storm water and channel and filter the released flow through the system fabric. The ditch check system can comprise a prefabricated vertical geotextile ditch check system or a kit with multiple components that can be easily and securely installed along sloped, angled, or other contoured storm water drainage ditches, culverts, etc. The ditch check system can direct and control storm water flows at different, varying velocities, filter sediment and other solids from such storm water flows, and have the structural integrity to prevent failure during heavy rain and/or flooding when water levels and volumes are significantly increased. While some devices that receive storm water flow can address either the need for either controlling velocity or filtration, the disclosed embodiments can provide both functions while accommodating sloped or contoured geographies. The ditch check system can have a series of components configured to mount and/or attach together and cooperate to channel and slow storm water, including providing temporary detention thereof to trap displaced sediment and debris and allow the settling of coarse sediment. The ditch check system can also pool and release concentrated flow at the bottom of a storm water ditch as filtered horizontal sheet flow. As combined, the structure can further dissipate energy from the concentrated water flow, thereby minimizing erosion downstream.

Figure 1:
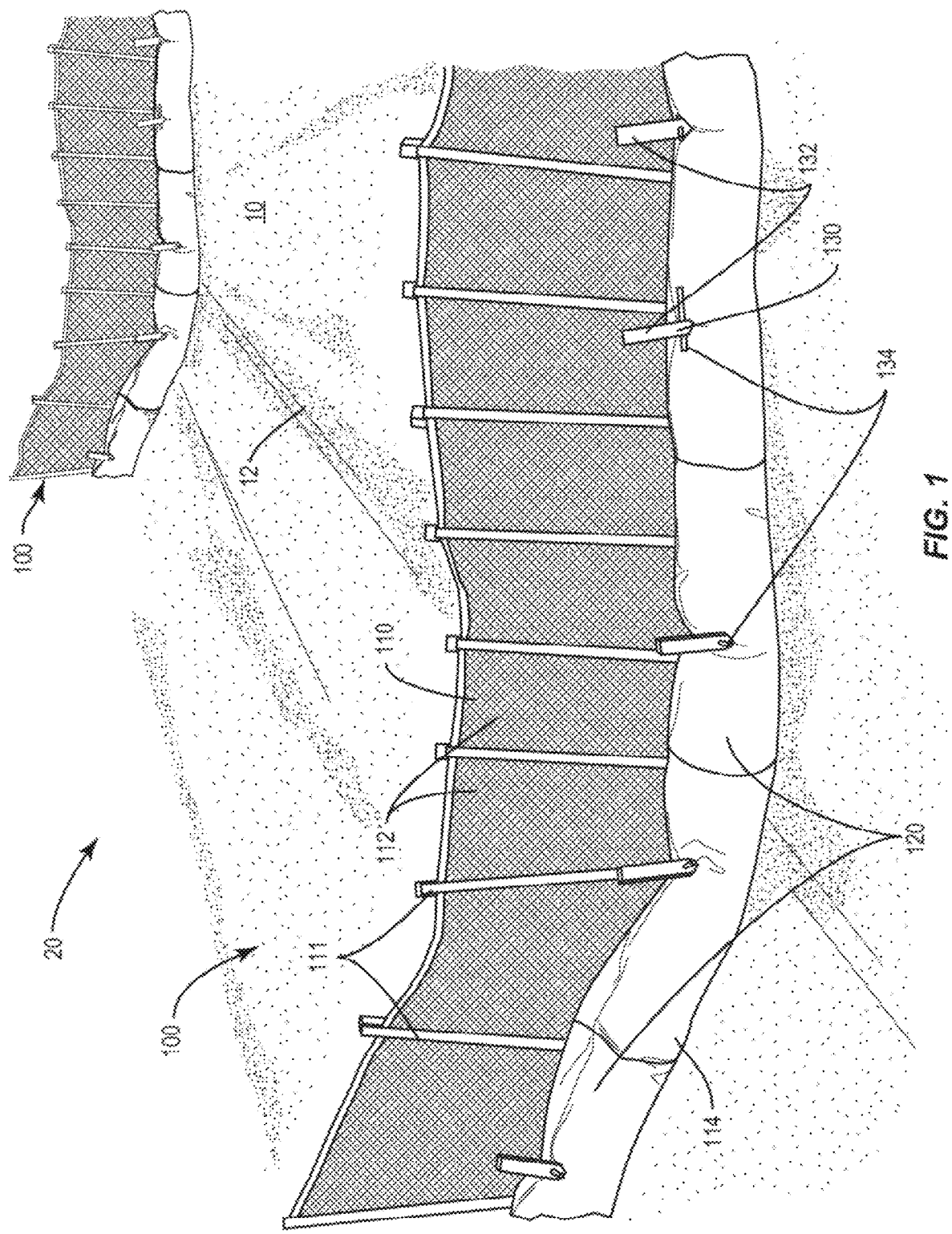
FIG. 1 is a perspective view of a central portion of a ditch check system according to principles of the present disclosure.

Turning to the figures, FIG. 1 illustrates a partial view of one example of a drainage control system 20, shown in an example non-limiting embodiment as comprising a vertical ditch check system 100. In many examples, the ditch check system can be set-up with a first component that can comprise a contoured velocity-restricting component or velocity-restricting component 110 that can include a vertical filter sheet of a water-permeable material attached along one side (e.g. a first or front side) near the bottom (ground level) to a substantially horizontal first or front water seal 114, and attached along an opposite side (e.g. a second or rear side, as further shown in FIG. 4) at the ground level to a horizontal second or rear scour guard 116.

By way of illustration and not limitation, in embodiments, a ditch check system 100 can be provided as a kit with a series of prefabricated components. For example, the components of the kit can include a vertical velocity-restricting component 110, front water seal 114, and rear scour guard 116 of the velocity-restricting component 110, which can be sewn or stitched together along the bottom of a body of a contoured vertical section (e.g. ground level) to form the one piece/three component assembly that is pre-shaped to fit the contours of storm water ditches. Alternatively, adhesive materials and/or fasteners can be used secure mating interfaces between each of the components. To facilitate transportation and installation, the components of the ditch check system 20 are supplied as a package, and multiple such packages can be staged along the length of the same drainage ditch for improved flow management. The modular kit can also help to ensure quality control and consistency in installation of the system.

The velocity-restricting component 110 can be attached to vertical posts or stakes 111 spaced at different intervals relative to a central channel 12 of the storm water ditch 10. The stakes 111 can be wooden, metal stake or rails, polymers, or other resilient and durable materials capable of supporting segments 112 of velocity restricting component 110. In some examples, the segments 112 can be formed as panels extending lengthwise along the velocity restrictor sheet 110. Various fasteners, such as staples, pins, nails, rings, clips, or other fasteners can be used for fastening the sheet to the stakes 111.

The ditch check system 100 also can include a series of compression tubes 120 that can be applied or located on top of the front water seal 114 and can be held in place with a series of spaced compression stakes 130 to prevent migration of the compression tubes 120 that could otherwise undermine the system. In some examples, the compression tubes 120 can comprise weighted tubes, and can include elongated bags of a polymeric fabric or similar flexible material. For example, the compression tubes 120 can be a polyethylene, polypropylene, nylon, or other, similar fabric material. The material can be permeable or impermeable, depending on the application. The compression tubes can act as a dam or berm to aid in directing the storm water through the sheet body of the vertical velocity-restricting component 110. The lengthwise line of tubes can slow the velocity of storm water flows and can provide controlled storm water release. In addition, in some examples, the tubes can back up and can provide some ponding of storm water flows, allowing some collection of sedimentation and/or solids upstream of the velocity-restricting component 110. This settling can also limit the unimpeded travel of pollutants (e.g., metals, hydrocarbons, oils, and/or other unwanted substances) which might otherwise reach the local environment.

The compression tubes 120 can be filled with a filler material, for example, and not limitation, in some embodiments, the compression tubes can be filled with pine chips. Other materials also could be used. The ballast can be disposed within the bag of the compression tubes 120 and substantially fill the tubes to provide sufficient weight to restrain movement, including when placed on a downhill slope along which storm water may flow, e.g. along the sloping sides of a storm water drainage ditch. The weight can also prevent erosive undermining and destabilization of the ditch check system 100. The compression tubes 120 can be provided in varying lengths, with a number of tubes provided based on the size and/or configuration of the installation. For example, in certain examples the compression tubes can vary between approximately 5' and approximately 10' in length.

The compression tubes 120 (for example, Silt Saver® Heavy weight Compression Tubes) can be placed on top of the front water seal 114 and staked down with the compression stakes 130. The compression stakes 130 can be spaced at selected intervals along the compression tubes 120 based on length of the installation and expected water flow conditions. In some examples the compression stakes 130 can have two components. A stake portion 132 can penetrate the compression tubes 120 and front water seal 114 and into the soil of the ditch 10 below. The compression stakes can also incorporate a horizontal compression pin 134 to enhance compression of the compression tubes 120. The pin 134 can be a dowel or rod extending through the stake portion 132 approximately perpendicular to the axis of the stake portion, such that when the compression stakes are driven into the soil, the pins 134 exert additional downward clamping force onto the compression tubes 120 to help tie them in position relative to the velocity-restricting component 110 and the front water seal 114.

In general, the terms velocity-restricting component, vertical flow restrictor, filter sheet, etc. are used interchangeably herein. The purpose of these elements is sufficiently described so as to be understood by those of skill in the art.

The pooling of storm water that does not infiltrate into the soil can create hydrostatic pressure which can undermine and ultimately cause the failure of traditional ditch check or rock dam systems. The use of compression tubes 120 in the ditch check system 100 combine with the upstream water seal 114 to form a water seal, configured to minimize a traditional point of least resistance for storm water flows or leakage under the vertical velocity-restricting component 110. Instead, the water flow can be redirected through the vertical body of the velocity-restricting component 110. This orientation limits the pooling of water to prevent such failures from rising hydrostatic pressure. As the water travels through the velocity-restricting component 110 it is converted into horizontal sheet flow, further reducing the hydrostatic pressure of the flow. This conversion to horizontal flow yields less hydrostatic pressure and helps to prevent sediment disruption downstream of the ditch check system 100.

Figure 2:
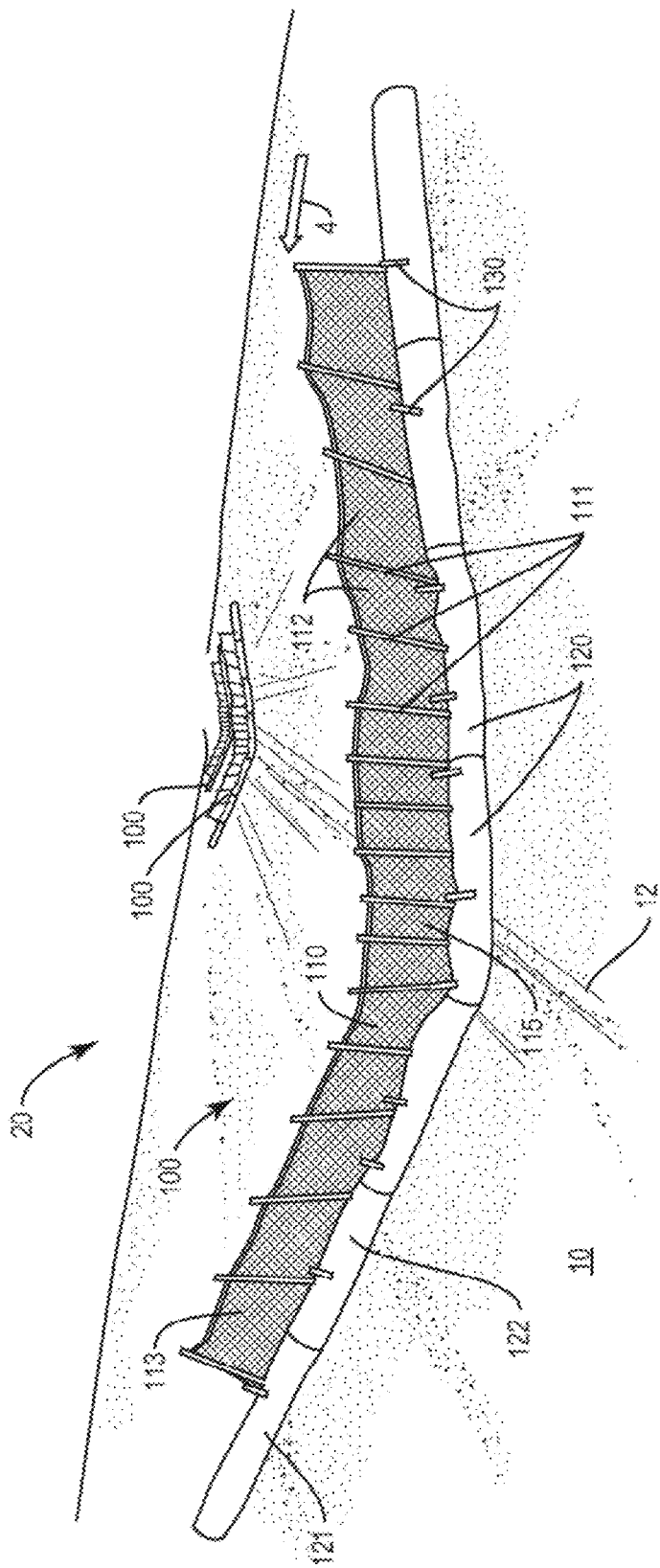
FIG. 2 is a perspective view of the ditch check system according to principles of the present disclosure.

The components of the ditch check system 100, for example as illustrated in FIG. 2, can be connected and/or assembled in various orders. In many cases, the ditch check system 100 may be supplied pre-assembled, such that the stakes 111 are pre-attached to the velocity-restricting component 110 using fasteners. Similarly, the front water seal and the rear scour guard (114, 116, see e.g., shown in FIG. 4) can be supplied sewn or stitched to a lower portion of the velocity restrictor sheet at or near ground level. In other examples, the front water seal and the rear scour guard can be attached through heat welding, ultrasonic welding, or other means. The system can then be rolled up, folded, wound onto a support roll, or the like for easy transportation and maneuvering. Alternatively, the fasteners for securing the sheet segments 112 of the velocity-restricting component 110 to the sheet stakes 111 can be inserted on site through the stakes 111, through the segments 112, or both provided that the resulting connection is secure.

Once at the site, the assembly can be easily moved to the target position within a ditch 10 as a compact unit. The ditch can be primarily v-shaped, as illustrated in FIG. 2, with a central channel 12 at the vertex for channeling flow. In other examples, the ditch can be excavated so as to assume other shapes dictated by the topography and layout of the specific site, so long as water can be channeled along a pre-planned route or routes.

The stakes 111 can be driven into hard pan soil and spaced at various intervals dependent upon their distance from the highest velocity of the storm water flow in the center of the ditch 10 to address the increased hydrostatic pressure in that channel. The primary force of concentrated storm water flow is directed at the center of the ditch and is reduced as it extends laterally. Vertical post or stake spacing is adjusted based upon the proximity to the central channel 12 of the ditch 10 to enhance the structural integrity of the system. For example, FIG. 2 shows there can be greater spacing between the stakes or posts 111 at the outer segments 113 near the lateral edges than central segments 115 at or near the central channel of the ditch. The spacing of the stakes 111 can thus be adjusted to provide an additional level of stability and support to particular localized portions of the velocity-restricting component 110 of the system. In this manner, the velocity-restricting component 110 can be securely positioned at desired locations for filtering runoff water flows passing therethrough while preventing the passage of silt or debris therethrough. Additionally, depending on the particular application, additional fastener supports can be utilized at various points to improve sedimentation by further stabilizing the structure so it can retain more solids, particularly during heavy flow.

In many situations, appropriate temporary erosion and sediment control can involve using multiple ditch check systems 100 in series in the downslope of the same ditch 10 (also shown in FIG. 2). The spacing between the velocity-restricting components 110 of the ditch check systems 100 can be based on the gradient of the ditch channel 12.

The arrangement and porosity of the velocity-restricting component 110 can be tailored for the expected or desired flow through each system in the series. In areas of particularly high flow volumes and velocities, such a series can allow for a more orderly and stable transition to sheet flow as the storm water travels progressively further downstream 4. For example, a ditch check system 100 installed further upstream 2 in the ditch 10 can have a more porous velocity-restricting component 110 than those of systems installed further downstream 4. The succession of systems can promote a metered slowing of flow velocity and a reduction of turbulence, such that low-energy ponding of runoff water can prompt settlement and deposition of suspended solids, especially larger particles which can be sensitive to small changes in flow velocity.

During assembly, the layout of each ditch check system 100 in the series can easily be arranged and checked for adjacent assemblies in both the lateral and flow directions prior to being fixed in place. If necessary, adjustments can be made to ensure overland flows, as drawn downstream 4 by gravitational forces, are properly channeled and slowed by the successive restrictor sheets. The stakes 111 can then be inserted and driven into the soil of the contoured ditch 10 as desired at intervals, and one or more of the compression tubes, water seal and the scour guard can be pinned or secured to seal the systems.

Figure 3:
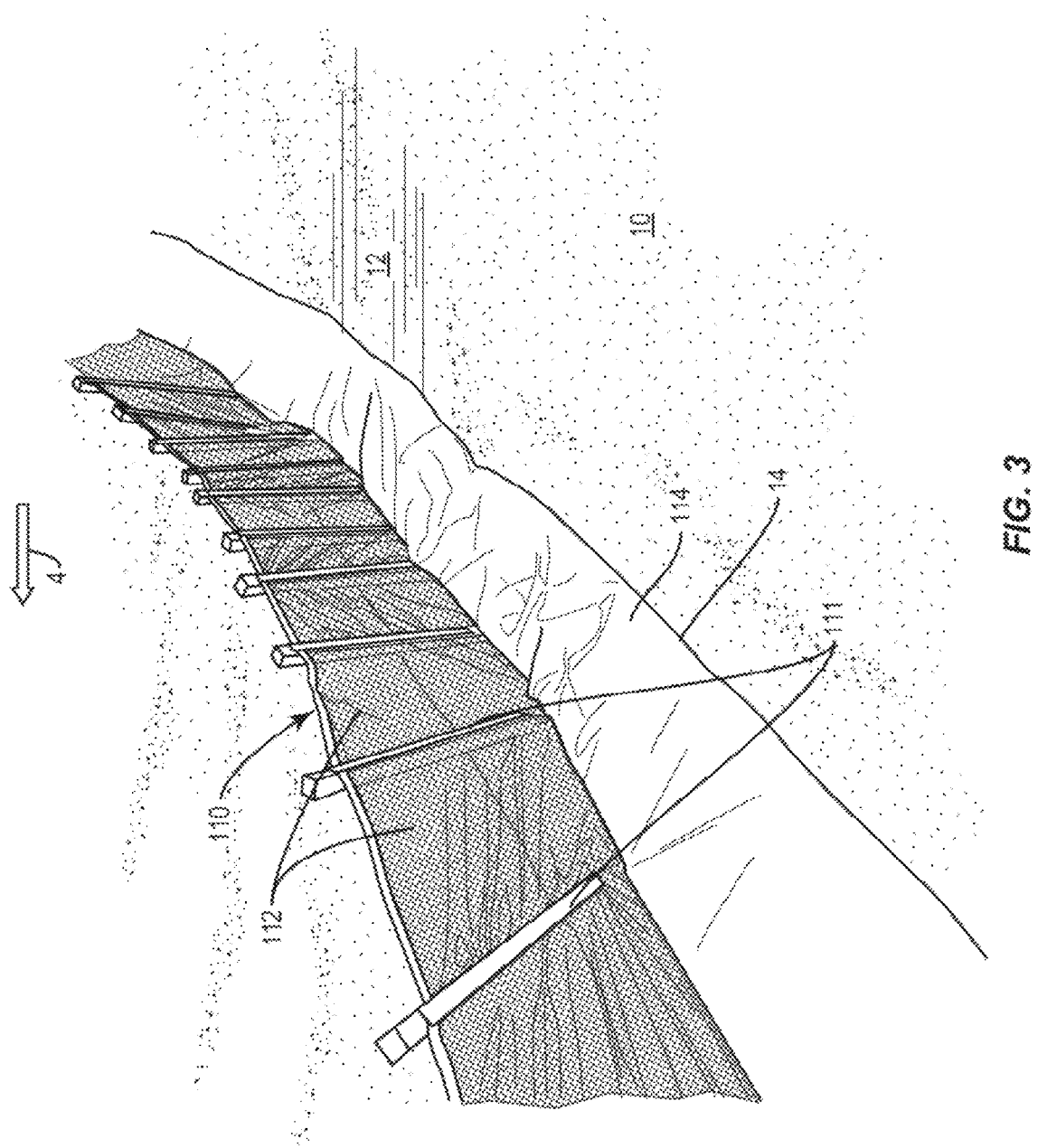
FIG. 3 is another view of the ditch check system of FIGS. 1-2, showing various aspects thereof according to principles of the present disclosure.

As seen in FIG. 3, the velocity-restricting component 110 is fabricated at angles to address the contours of a storm water ditch. By conforming to the angles and length of the ditch slopes, the system can accommodate high velocity flows within the ditch channel while preventing bypass of storm water around the barrier. The fabric of the segments 112 of the velocity-restricting component 110 can be attached firmly to each of the supporting stakes 111 or posts with fasteners, and supporting bonding strips can be used to prevent horizontal migration and to enhance the linear strength of the system. The stakes 111 are attached at selected locations and elevations and/or lengths to facilitate mounting along the ditch 10, substantially matching the slope/contours thereof.

The horizontal front scour guard 114 can be attached to the velocity restrictor sheet 110 at or near ground level. The front scour guard 114 can act as a water seal and lay flat with the ground lengthwise along the velocity-restricting component 110 in front of the vertical stakes 111. The front scour guard 114 is shown in FIG. 3 prior to emplacement of the compression tubes and stakes above.

In some examples, an upstream trench 14 or toe-in can be excavated into which to tuck the front scour guard 114 (and subsequently the compression tubes) to seal and preclude water from flowing underneath the ditch check system 100. The upstream trench 14 and front scour guard 114 can be oriented transverse to the expected direction of water flow.

As used herein, the terms "water seal" and "scour guard" are interchangeable and intended to cover a variety of permutations. In some examples, the "water seal" and/or "scour guard" can comprise a substantially impervious membrane material for anchoring with fasteners, staples, adhesives, and/or weights. In other examples, some components such as the "water seal" can comprise a geotextile fabric and can be partially buried or otherwise secured to prevent water from flowing beneath the ditch check system 100.

The trench 14 can be relatively shallow such that there is little volume available for the collection of water. For example, the front scour guard 114 can be pinned into a 4" deep trench at 2' intervals with sod pins or staples. The trench 14 can be, for example, 1"×10", 2"×8", 3"×6", or a 4"×5" trench, or can further vary in depth and width as desired or as dictated by site geography. When the front scour guard 114 is tucked into the contours of the trench 14, the trench can be backfilled and compacted. In some situations, it can be desirable to leave a compacted ridge of soil along the upslope edge of the sheet 110.

In other examples, the present ditch check system 100 does not necessarily require a full upstream trench for the vertical velocity-restricting component. The location can often have only a toe-in or a natural shallow recessed area lengthwise along the velocity-restricting component for the front scour guard.

Figure 4:
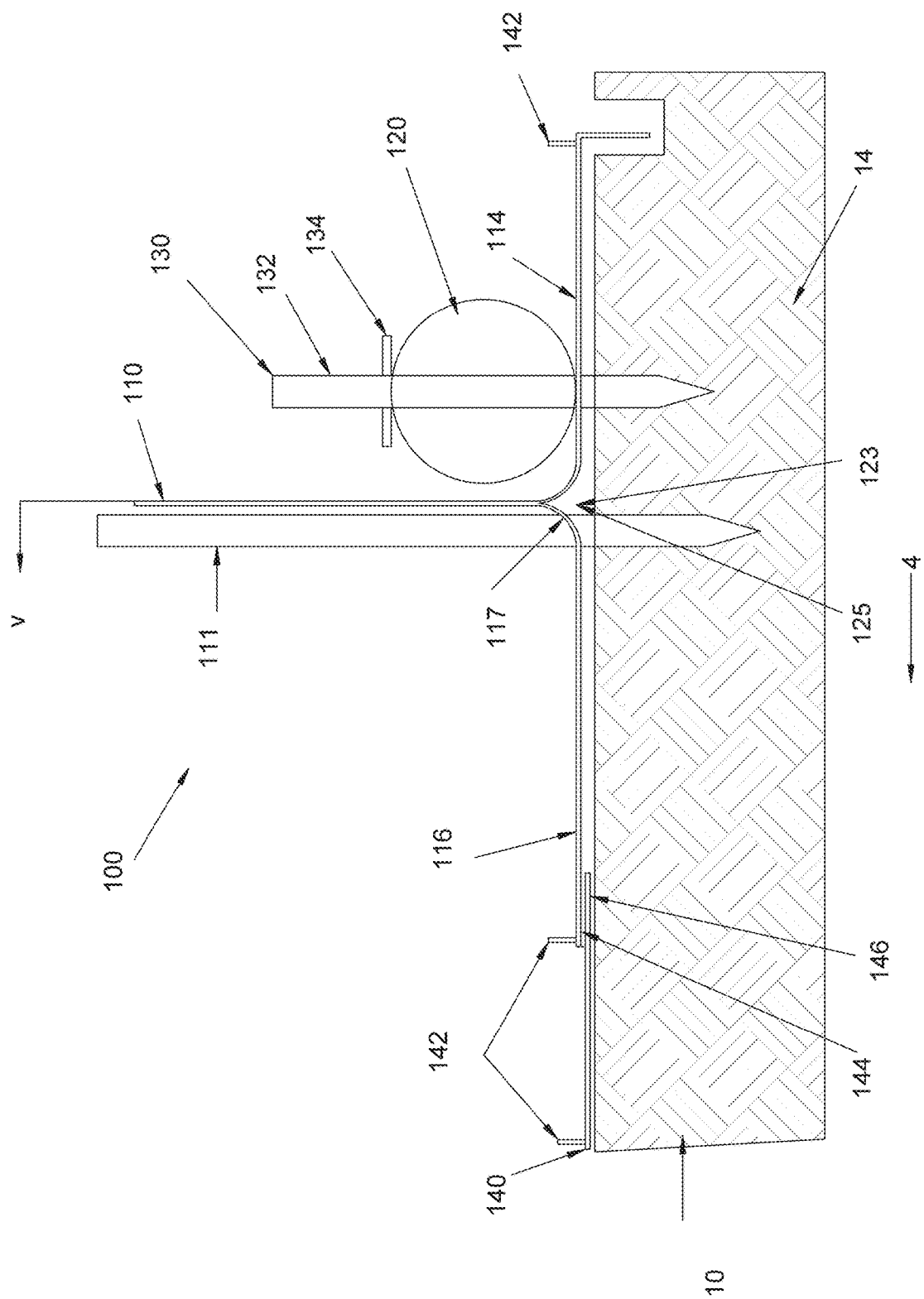
FIG. 4 illustrates an end view of the ditch check system of FIGS. 1-2, showing various aspects thereof according to principles of the present disclosure.

An end view of a representative ditch check system 100 is shown in FIG. 4. The area around the lower end of the velocity-restricting component 110 can generally extend below the lower edge 117 of the sheet at the nominal ground level of the storm water ditch 10 to a bottom edge 125 and backfilled or covered with ground cover such as dirt, rocks, etc. placed thereover to provide additional support and anchoring for the velocity-restricting component 110 while still enabling the passage of water therethrough. A lower portion 123 of the velocity restricting component can also have an angled, curved, hooked, or similar configuration and can engage or be in contact with a portion of the rear scour guard proximate the bottom edge 125 and can be turned upwards to provide channel or similar area for receiving and engaging the ground cover to provide further anchoring and support for the lower end of the velocity-restricting component 110.

In some examples, although only a single layer is shown in FIG. 4 it can be beneficial to stack two or more layers or plies of material in the velocity-restricting component 110 as an alternative or supplemental control mechanism. It can further be understood that each of the plies or layers can themselves be formed from multiple plies or sheets attached or connected in series to form a stack. In some embodiments, the velocity restricting component also can be integrated with or attached to both the front water seal and the rear scour guard as shown in FIG. 4.

The compression tubes 120 can be weighted and confined by the compression stakes 130 against which they are placed. The compression tubes 120 can have multiple individual sections that are a homogenous length, or the sections can have various lengths depending on the contours of the ditch and attachment requirements with the rest of the ditch check system 100. For example, the compression tubes can vary between approximately 5' and approximately 10' in length. In other examples, shorter linking tubes of less than 5' may be necessary to prevent flow gaps between longer tube segments. In one embodiment, the compression tubes can have varied lengths depending on the configuration of the storm water ditch or other installation. For example, a first compression tube 121 can have a length greater than the length of a second compression tube 122 in order to better follow the sloping sides of the storm water ditch 10.

In some embodiments, the stake portion 132 can extend into the soil of the ditch 10 below the front scour guard 114 in the upstream trench 14 such that, in combination with the compression pins 134, there is three-dimensional constraint of the various compression tubes 120. For example, the stake portion 132 and the compression pins 134 of the compression stakes 130 can form a substantially t-shaped configuration as shown in FIG. 4. The compression tubes 120 can laterally but against each other such that the internal fill contours to each interface of adjacent tubes. This anchoring helps prevent migration of the tubes 120 which may allow for potential undermining of storm water beneath the compression tubes 120 of the ditch check system 100.

The front water seal 114 and rear scour guard 116 can be attached at or near the lower end 117 at ground level of the velocity-restricting component 110 (e.g., as indicated in FIG. 4) by various means so they can provide a seal against storm water flow passing beneath the ditch check system 100. The free edges of the front water seal and the rear scour guard can then be fixed in place, for example, using sod pins 142, staples, or other suitable implements.

In some examples, to isolate the soil beneath and further protect the soil downstream of the velocity-restricting component 110, an extended scour guard 140 can be positioned at the rear of the rear scour guard 116. At least the trailing edge 144 of the rear scour guard can overlap with the leading edge 146 of the extended scour guard 140 to prevent water penetration at the interface. Alternatively, at least a portion of the rear scour guard 116 and/or extended scour guard 140 can be at least partially buried to help anchor the ditch check system 100 in the ditch 10. The free edges around the perimeters of the rear scour guard 116 and extended scour guard 140 can then be secured in place similar to the front water seal 114 with sod pins 142 (as shown in FIG. 4) or with staples or other implements.

Figure 5:
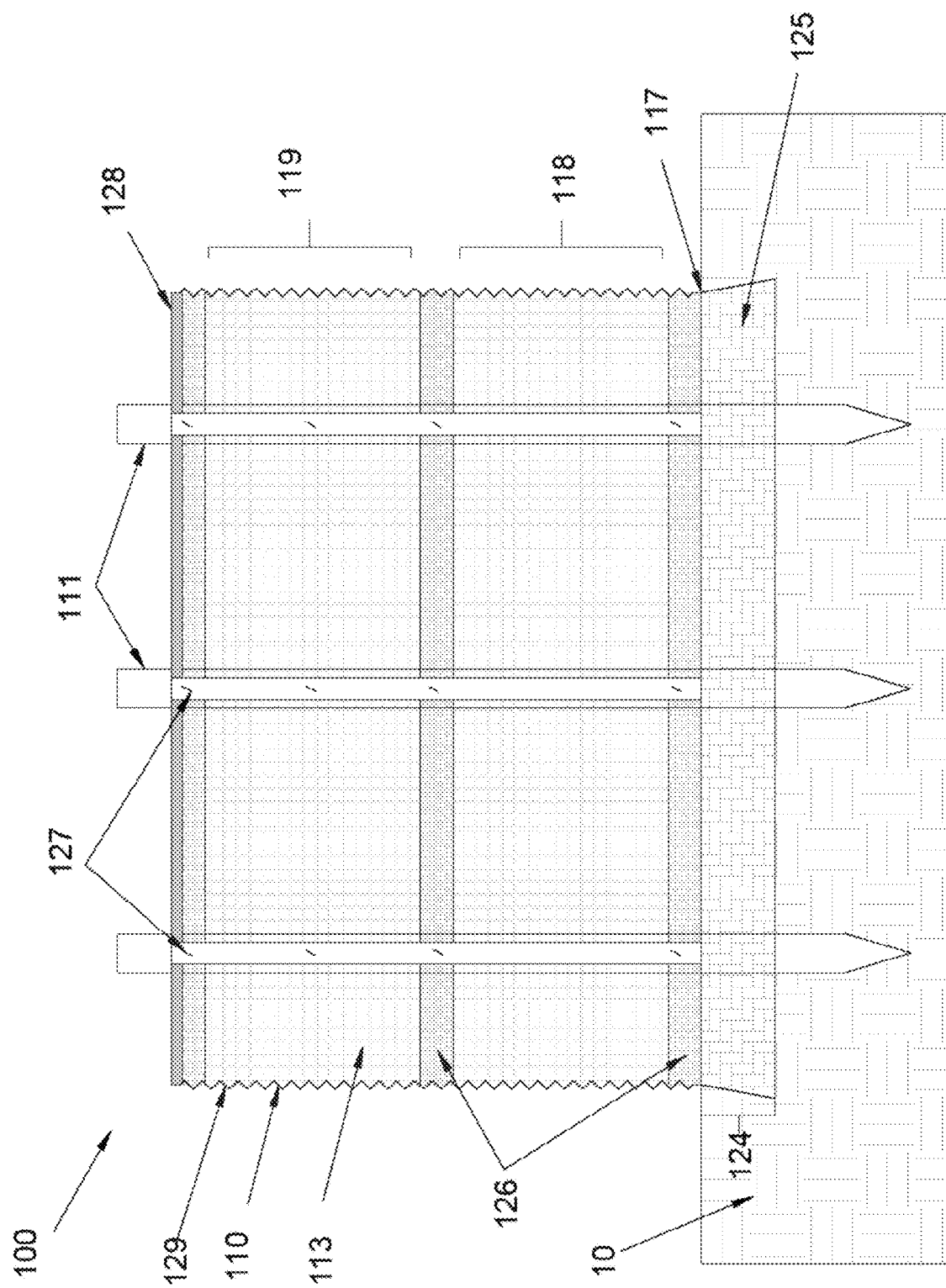
FIG. 5 illustrates an end view of a portion of a velocity-restricting component and other components of the ditch check system showing various aspects thereof according to principles of the present disclosure.

As generally shown in FIG. 5, the velocity-restricting component 110 can generally comprise a reinforced sheet of material comprising a bottom edge 125 and a top edge 128 defining a body 129. The body 129 can have one or more webs 113 (these may also be referred to as "sheets" or "fabrics") of a substantially water-permeable material. Various materials can be used which meet performance requirements for silt retention, erosion control, and storm water applications. The web 113 of the velocity-restricting component 110 can be any suitable water-permeable material used to retain silt and debris while allowing passage of water therethrough. As storm water impacts the surface of the velocity-restricting component 110, flow will be allowed to pass through the permeable material but sediment and debris will be restricted, causing sediment and debris to build up in the ditch 10 along the upstream-facing portions of the velocity-restricting component 110. In this way, the disclosed ditch check systems can filter unwanted matter from the storm water and may retain them in the v-shaped section of the velocity-restricting component 110 of the ditch check system 100 where they can be later removed.

The materials of the velocity-restricting component 110 can be homogenous, or the web material 113 can have woven fibers which can have staged sections or porosities across the height and width of the velocity-restricting component 110. In some examples, a non-woven web can be spun-bonded, knitted, or other similar fabric or sheet filtering materials with varied pore sizes. Alternately, the web material 113 can be a woven material with varied opening sizes for filtering sediment, particulates, and/or other matter.

The web material 113 can be a sheet formed from natural materials, synthetic materials, or a combination thereof. The silt retention materials can be formed from one or more polymers or polymeric materials. As used herein the term "polymer" or "polymeric material" includes, but is not limited to, homopolymers, copolymers, such as for example, block, graft, random, and alternating copolymers, terpolymers, etc. and blends and modifications thereof.

One example of a fabric that may be suitable for use as a material for the velocity-restricting component 110 is shown and described in U.S. Reissue Pat. No. RE 42,095, the disclosure of which is incorporated by reference as if fully set forth herein, and can include a belted silt retention fencing material, such as BSRF® geotextile silt and/or sediment control failure material commercially available from Silt-Saver, Inc. (Conyers, Ga.) under the trade name BELTED SILT RETENTION FENCE fabric. Other example fabrics can include woven and non-woven polypropylene, polyethylene, and other fabric materials such as, for example, Amoco Fabrics and Fibers Company (Austell, Ga.) PROPEX® 1198 geotextile.

As used herein, the term "water-permeable" generally refers to the ability of an element or article to allow water to pass or flow therethough. The flow rate of water through a "water-permeable" structure as used will be sufficient for soil erosion and ditch check applications in which storm water runoff must be filtered and allowed to pass through the structure without substantial pooling or flooding around the silt retention sheet(s) when installed. For example, in embodiments, flow rates in a range or about 50-70 gal/min/ft$^2$ or greater can be used. However, it will also be understood that whether a particular material is sufficiently water-permeable will depend on the particular application for which the material is used, the particle size of each component in the soil, and numerous other factors understood to those of skill in the art. Thus, while certain examples are provided and described herein, it will be understood that the performance criteria for a given application may vary and that some materials can be suitable for some applications and not be suitable for others.

A series of reinforcement elements 126 can be integrally formed therewith or otherwise attached and applied to the web 113 of the of the velocity-restricting component 110 at spaced locations. For example, at least one reinforcing band can be attached or integrated therealong spanning the opposing sides of the velocity-restricting component. The reinforcing elements 126 can be located along the sheets, in positions so as to serve as points of attachment for fasteners 127 that are used to fasten the reinforced silt retention sheets to the vertical support stakes or members 111 to anchor the web 113 in position to filter silt and debris from storm water flows. The fasteners 127 can be a staple, pin, clip, hook, hook and loop, snap, band, screw, nail, or other implement capable of penetrating the fabric of the velocity-restricting component 110 and securing it to the stakes 111. As shown, the fasteners 127 can be inserted through the reinforcing elements 126 for a more secure connection to prevent displacement of the segments of the velocity-restricting component 110 during heavy flows passing therethrough. The reinforcing elements 126 can thus help to minimize tearing of the fabric at or proximate to the attachments points along the stakes 111, thereby reducing the failure rate of the system.

In one example, as shown in FIG. 5, the reinforcing elements 126 can be integrally formed with the web material 113 of the velocity-restricting component 110. The web material 113 can be a woven material having a desired denier, e.g., approximately 1 to about 10 denier per fiber (dpf), with the reinforcing elements 126 being formed as areas of an increased denier per fiber. The velocity-restricting component 110 can be formed with bands, strips, patches or other areas of an increased thickness of the weave and/or fibers, defining the reinforcing elements 126. The reinforcing elements can also be regions having a higher denier per fiber of approximately 1.5-2 times (or greater) than other web sections 113 of the velocity-restricting component 110. These regions can commonly be 0.25"-2.0" in height and/or width, although other sizes can also be used. As a result, the body of the component can be provided with integrated reinforcing elements defining linear support areas at selected intervals therealong for strengthening and providing added support for attachment of the velocity-restricting component 110 to vertical supports or stakes 111. Such linear support areas provide horizontal load support strength and control as hydrostatic pressure is increased against the velocity-restricting component 110 with the rising storm water flow, while the vertical stakes 111 provide further support/control of the loads without unduly increasing the thickness or overall weight of the sheet.

By way of example, and not limitation, in embodiments, the ditch check system 100 can be provided with a tensile strength within a range of about 200-400 lbs. in a warp direction (e.g. vertical, parallel to the length of the roll), and in some embodiments, about 260-275 lbs. in the warp direction; and about 150-275 lbs. in the fill direction (e.g. horizontal, perpendicular to the length of the roll), and in some embodiments, about 180-220 lbs. in the fill direction; a burst strength of approximately 150-250 lbs., and in some embodiments 175-180 lbs.; and a maximum elongation of about 30%-60%.

Additional reinforcing elements can be incorporated as needed into the velocity-restricting component 110 through bonding, such as through the use of adhesives, thermal bonding, or the like, needle punching, or other similar applications to provide further support and strength to the body of the sheet. In other examples, the additional reinforcing elements also can include cords, cables, wires, or other similar materials that are inter-woven with or interspersed within the fibers of the water-permeable web material 113 during the formation of the velocity-restricting component 110. As a further alternative, other materials, such as mesh, geogrid, or lattice structure can be used as a base for the web material 113 onto which the reinforcing material can be applied or spun.

In some embodiments, smaller reinforcement elements can also be placed between larger reinforcing elements as needed, depending upon the application in which the velocity-restricting component 110 is to be used. For example, in areas of expected heavier flooding or high silt, dirt or mud flows, such as in areas where landslides or mudslides may be prevalent, extra reinforcement can be provided in the form of strips, borders, or other geometric shapes. The reinforcing elements can provide enhanced load support and assist in creating a controlled transition from smaller to larger AOS between the flow control zones of the velocity-restricting component 110 without interfering or creating a blockage to flow. The reinforcing elements can also include additional resilient, high strength and non-toxic/environmentally friendly materials, such as fiberglass reinforced scrim or belting material.

In some embodiments, reinforcing elements 126 connecting the web 113 of the velocity-restricting component 110 can further be releasable and/or removable (i.e., via fasteners or the like) so as to enable repair and replacement of smaller portions or sections 112 of the velocity-restricting component 110 as needed, without having to substantially replace the entire velocity-restricting component 110.

In some examples, a velocity-restricting component 110 as shown in FIG. 5 can have a height of about 36"-40". An upper portion of the sheet body can remain above ground and can extend approximately 24". A retention zone 124 can extend upwards 8"-12" from a bottom edge 125 below ground level of the storm water ditch 10. With the construction shown in FIG. 5, a first flow control zone 118 can be a filtering section extending approximately 10"-12" from a lower edge 117 at ground level, with transition reinforcing element 126 between the first flow control zone 118 and the lower retention zone 124. This staged construction can be configured to allow, for example, quantities of storm water to be selectively released when certain rate and/or velocity criteria of the design have been met.

Similarly, in some embodiments, a transition between the filtering first control zone 118 and one or more second flow control zones 119 can include reinforcing elements 126 defining support areas for the velocity-restricting component 110, which can be approximately 0.5"-1.0" in width, although greater or lesser widths also can also be appreciated. The one or more second flow control zones 119 can be release stages designed to meter a greater amount of flow and transition from intermediate zones or areas which can vary in porosity. In addition to or instead of the reinforcing elements 126, the mating edges of the various adjacent zones can overlap or otherwise be joined to each other to provide increased horizontal loading strength/support to prevent localized collapse during heavy flow, and improve sedimentation by providing a more stable barrier capable of retaining more solids.

In some examples, the velocity-restricting component 110 can be supplied as a modular system having a lower body comprising one or more first filtering or sediment flow control sections and a retention section. These sections can have openings of varying porosities, the porosities generally increasing upwards from the retention section. In one example, a lower retention zone 124 can have a pore size of approximately 20-70 sieve, and can increase in size along or from a filtering first or upper flow control zone 118, including mesh opening sizes of various ranges. A subsequent second flow control zone or zones 119 can have still larger apparent opening sizes, for example increasing in mesh opening size along the body thereof, so as to define and/or form a series of release stages to enable further flow and overflow volumes to pass therethrough. Other pore sizes can also be anticipated, often based on surrounding soil content (for example, fine particulates such as clay).

Various intermediate and/or upper flow control zones can extend upwards from the lower sediment flow control section of the velocity-restricting component 110 and have increased opening sizes to allow still further increased flow volumes to pass through as water levels rise. Additionally, as floatables and other natural debris collect against the permeable portions of the system, they can further contribute to the filtration provided by the of the velocity-restricting component 110.

It should be noted that these structures are provided by way of example, not by limitation, and that further additional sections of water-permeable sections can be added as needed or desired. For example, once installed, silt and sediment can build at the base of a velocity-restricting component 110, effectively raising the ground level upstream of the ditch check system 10. To compensate, intermediate and/or upper overflow sections can, for example, be replaced or augmented, or additional sections can be added above the existing sections to reconfigure the overall flow profile through the velocity-restricting component 110. Furthermore, depending on the particular application and jurisdiction in which the system is used, various minimum physical property and performance requirements for storm water flows and/or erosion control may apply.

Figure 6:
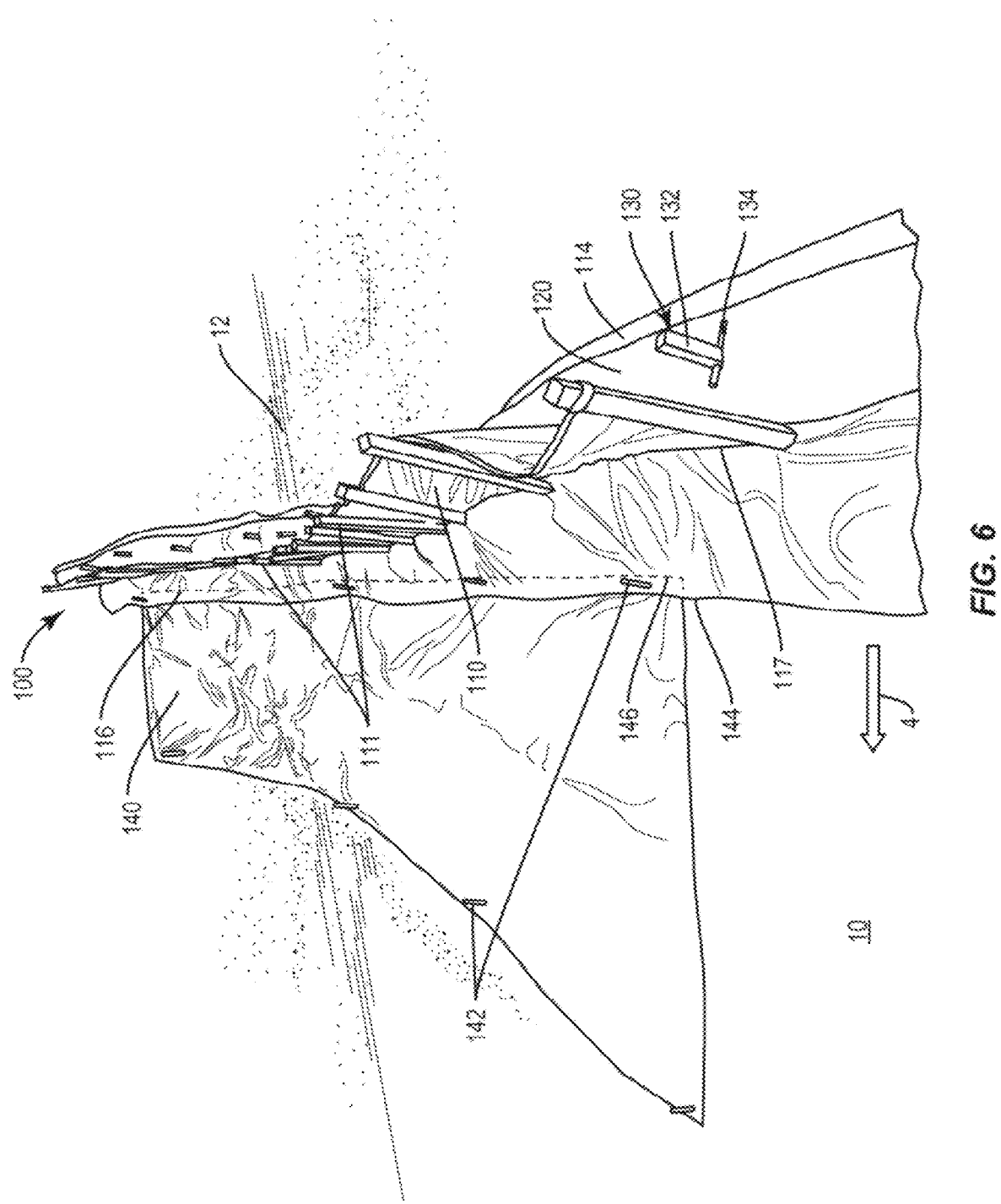
FIG. 6 shows another view of a velocity-restricting component and other components of the ditch check system according to principles of the present disclosure.

FIG. 6 generally shows some components of the example ditch check system 100 of FIG. 3 downstream in the direction of flow 4 from the velocity-restricting component 110. The attached rear water seal or scour guard 116 can lay lengthwise flat on the ground and extend downstream 4 behind the velocity-restricting component 110 to which it is attached. As storm water egresses from the velocity-restricting component 110, the underlying downstream soil of the ditch 10 is protected by the rear scour guard from disturbance and entrainment such that scour is minimized.

In some embodiments, an extended scour guard 140 can be positioned to extend beyond the trailing edge 144 of the rear scour guard 116 to add additional downstream soil protection to the ditch check system 10. The extended scour guard 140 also can be exchanged with, for example, various erosion control blankets, synthetic turf reinforcement mats, and/or other sheet/rolled erosion control products. The extended scour guard 140 can be placed at least partially under the attached rear scour guard 116 such that the trailing edge 144 of the rear scour guard overlays the leading edge 146 of the extended scour guard. Both sheets can be pinned around the edges with sod staples or pins 142 at selected intervals (e.g., for example, from 6" to up to 2' intervals). Other greater of lesser intervals also can be used as appropriate for the contours of the specific site. In some examples, grommets or similar means can be used to provide secure openings and prevent tearing of the rear and extended scour guards.

All horizontally oriented ground components of the ditch check system 100 can be pinned down around at least some of the outer edges with sod pins 142, stakes, staples, or other implements known in the art. For example, in an embodiment the extended scour guard 140 can be placed at least partially under the rear scour guard 116 and both components secured together at 2' intervals. Other intervals also can be envisaged to fit the contours of the ditch 10. In some examples, a layer of silt or soil can also be allowed to overlay the edges of the scour guards and/or compression tubes (through sedimentation of runoff and/or backfill during installation) to further anchor the edges of the system so the scour guards have good soil contact.

Figure 7:
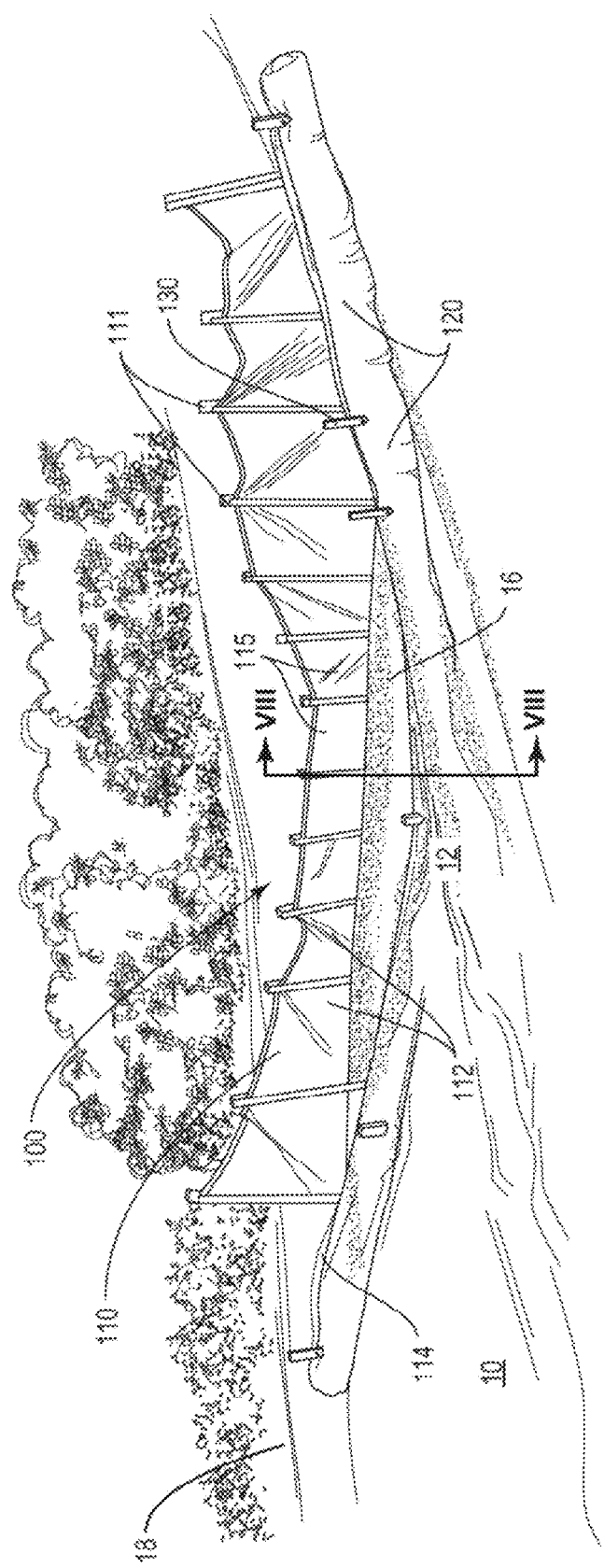
FIG. 7 illustrates an additional view of the ditch check system according to principles of the present disclosure.
Figure 8:
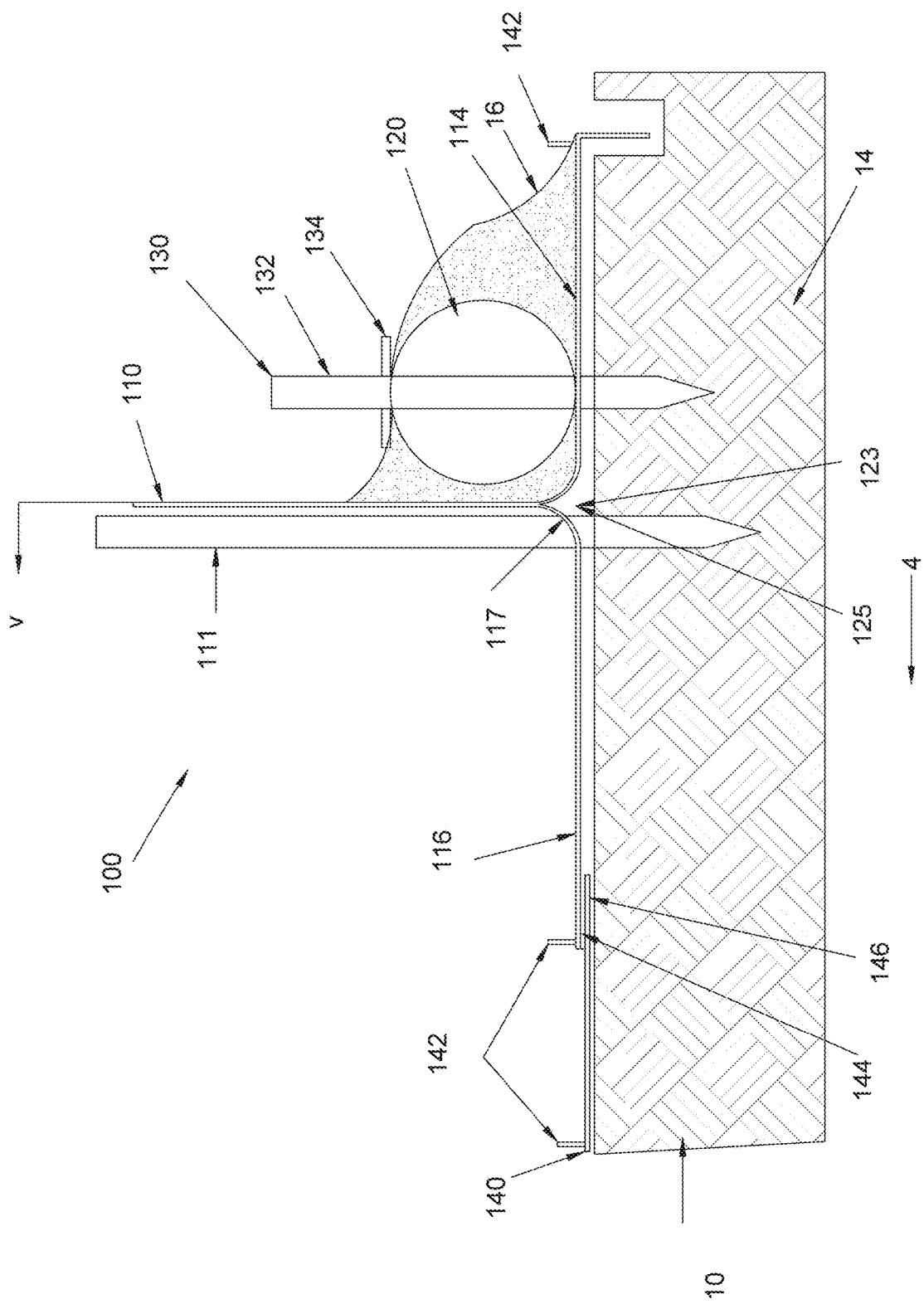
FIG. 8 depicts an end view, taken in partial cross-section, of the ditch check system of FIG. 7 according to principles of the present disclosure.

Further views of an example ditch check system 100 as disclosed herein can be seen in FIG. 7 and FIG. 8 along with exemplary surrounding terrain. The use of a prefabricated and/or pre-assembled system can allow the effective visualization of flow patterns for the design of future permanent control solutions at a site to ensure control of erosion and sedimentation is maintained. Prefabricated or pre-assembled systems can also mean less disturbance of surrounding areas, so the system can work in tandem with existing soil-stabilizing cover such as vegetation 18. Additionally, anchoring the system can also help to brace runoff channels during the establishment of the root structure for new vegetation.

It is recommended to check components of the ditch check system 100 for deficiency, or changes in the patterns of storm water runoff and erosion at a site to ensure proper management of water and sediment control is maintained through the life cycle of, for example, a construction project. This can be especially true due to seasonal changes in forecasted weather, such as high intensity storms or winter snowmelt conditions. In many cases, the use of prefabricated or pre-assembled ditch check systems such as those disclosed herein can simplify the relocation or positional adjustment of the system should it become necessary, in order to maintain a more laminar flow regime downstream or to compensate as deviations from expected flow patterns develop.

The fabric of the velocity-restricting component 110 of the ditch check system 100 can be, for example, a high visibility color (with each stage being the same or a different color) to provide a visual delineation of the overflow release and filtering stages and increase visibility of the entire system to workers. At the terminal edges of the ditch check system 100 on the sloping sides of the ditch, the fabric of the velocity-restricting component 110 can be wrapped around the outermost vertical stakes 111, by at least 360 degrees, to prevent tearing.

The modular nature of the velocity-restricting component 110 and other components of the pre-assembled ditch check system 100 can further enables additional sections of water-permeable web material having pores with varying mesh opening sizes or porosities can be added as needed. For example, silt and soil 16 can build up upstream of the velocity-restricting component 110 as storm water flows pass therethrough and sedimentation occurs, as illustrated in FIG. 7 and the cross section in FIG. 8. Alternately or in addition, the soil 16 can be deposited as backfill against the velocity-restricting component 110 and at least partially over the compression tubes 120. The soil buildup can further slow and filter storm water flows, but can also effectively raise the ground level around the ditch check system 100, allowing, for example, intermediate and or upper flow sections of the velocity-restricting component 110 (e.g., 118 and 119 in the example in FIG. 5) can be replaced and/or augmented.

Figure 9A:
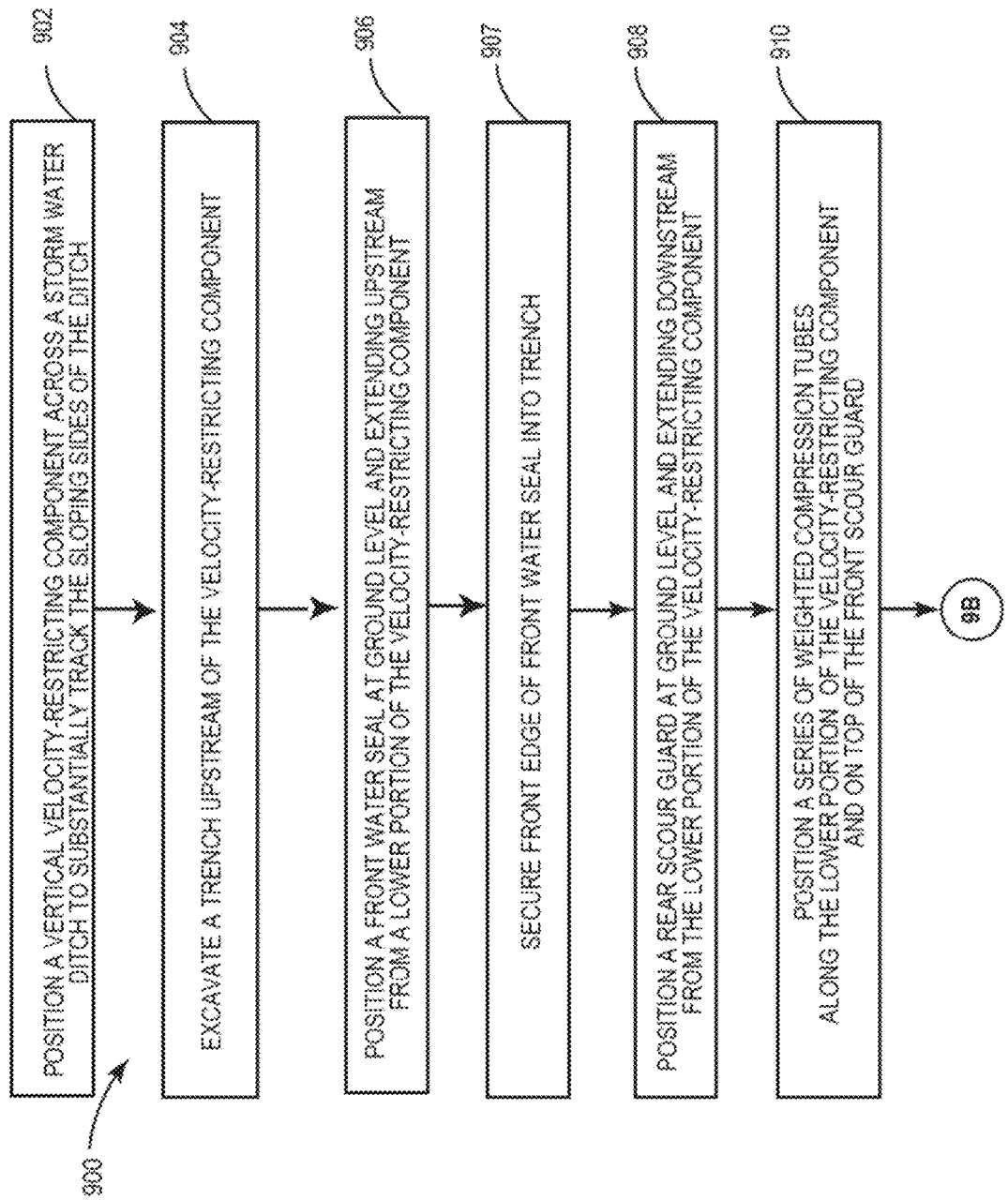
FIG. 9A is a block diagram of an example method for installing a ditch check system according to principles of the present disclosure.
Figure 9B:
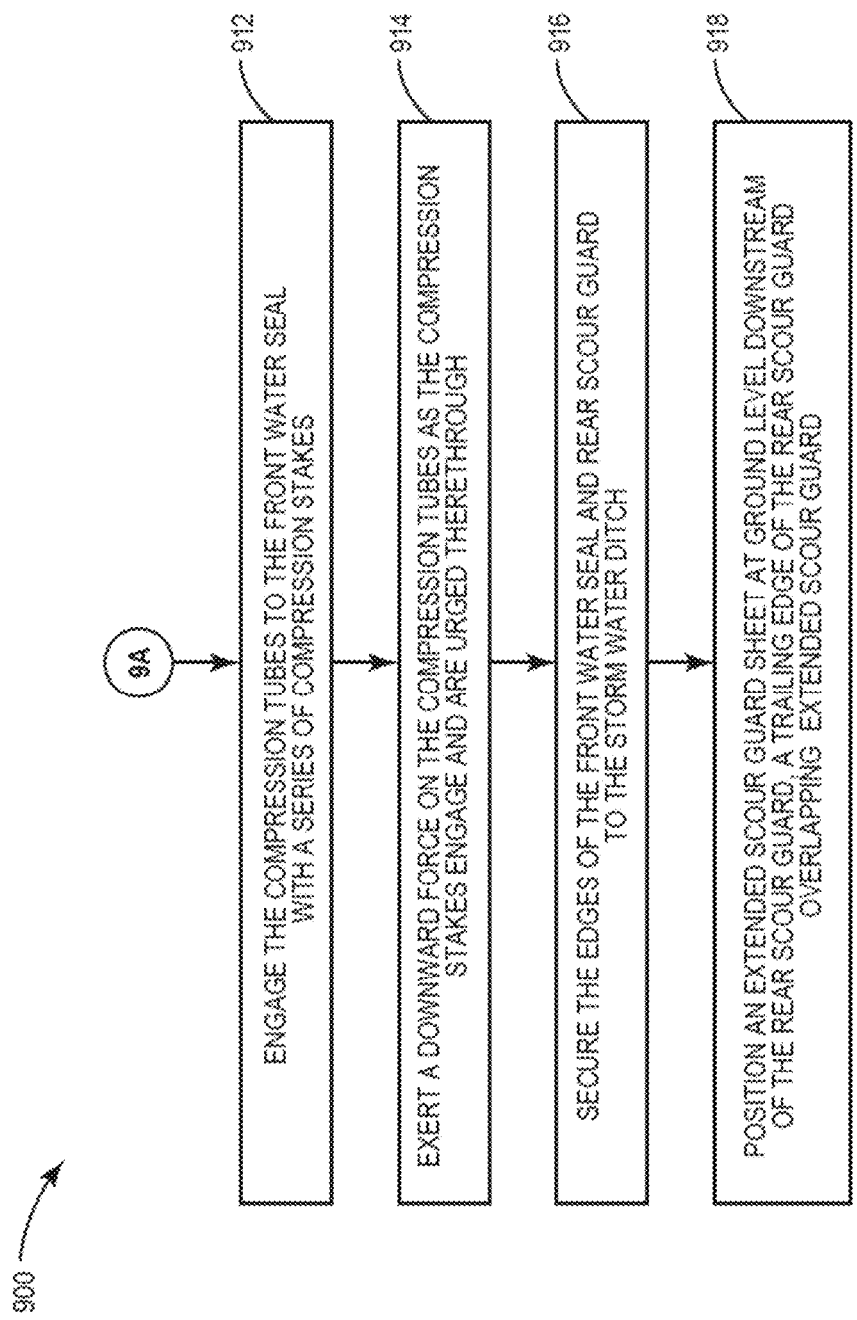
FIG. 9B is a continuation of the block diagram shown in FIG. 9A according to principles of the present disclosure.

FIG. 9A and FIG. 9B illustrate an example method 900 for installing a ditch check system, for example, any one or more of the example systems described herein, as well as others. The example method 900 is illustrated as a collection of blocks in a logical flow graph, which represent an example sequence of operations or steps. The order in which the operations are described is not intended to be construed as a limitation, and any number of the described blocks may be combined in any order and/or in parallel to implement the method.

In FIG. 9A, the example method at 902 can involve the step of positioning a vertical velocity-restricting component across a storm water ditch so the velocity-restricting component tracks with the sloping sides of the ditch. The storm water ditch can be pre-existing or otherwise configured with sloping sides and a central channel designed to collect and direct storm water flows toward a generally central drainage area or flow channel. The velocity-restricting component can comprise a geotextile fabric having one or more porosities. The porosities of the velocity-restricting component can form a plurality of release stages configured to allow a different velocity or flow rate to pass therethrough. As indicated at 904, the example method can involve excavating a trench upstream of the velocity restricting component. The trench can be used, for example, for the placement of other components as described herein to seal and preclude water from flowing underneath the ditch check system.

At 906, the example method can include positioning a front water seal upstream of the velocity-restricting component, and at 908 can include positioning a rear scour guard downstream of the velocity-restricting component. The front water seal and the rear scour guard can, for example, comprise water-impermeable sheets attached at ground level and supplied with the velocity-restricting component as part of a pre-assembled package or kit. At 910, embodiments of the example method also can include positioning a series of compression tubes on top of the front water seal and along the lower portion of the velocity-restricting component. In some example embodiments, the front water seal and compression tubes can be installed in the trench excavated ahead of the velocity-restricting component (see, e.g., step 904).

Referring to FIG. 9B, the example method at 912 can include a step of engaging the compression tubes with the front water seal using a plurality of compression stakes. The stakes can, for example, be driven through the compression tubes and the front water seal and into the soil therebelow. The compression stakes can secure the position of the compression tubes, so they resist migration of the compression tubes upon impact of storm water thereagainst. At 914, the compression stakes can be used to exert a downward force on the compression tubes as they are engaged.

In embodiments, the example method, at 916, further can include the step of securing the edges of the front water seal and rear scour guard to the soil of the storm water ditch with sod pins, staples, or other suitable fasteners. In some embodiments, an extended scour guard at can be positioned downstream of the rear scour guard to provide additional soil protection to the ditch check system. At least a trailing edge of the rear scour guard and a leading edge of the extended scour guard can overlap to prevent the passage of storm water flows between them.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values±20% of the recited value, e.g., "about 90%" may refer to the range of values from 71% to 99%. In addition, the terms "upstream" and "downstream" relate to the direction of storm water flows. Thus, "upstream" relates to a position of flow in advance of a system as disclosed and described herein. Similarly, "downstream" relates to a position of flow trailing a system as disclosed and described.

The present disclosure has been described herein in terms of examples that illustrate principles and aspects of the present disclosure. While the specific examples described herein are described in detail, it is to be the detailed description and drawings herein are made merely for purposes of providing a full and enabling disclosure of the present invention. The skilled artisan will understand, however, that a wide gamut of additions, deletions, and modifications, both subtle and gross, may be made to the presented examples without departing from the spirit and scope of the present disclosure. Changes in detail and structure can be made without departing from the spirit of the invention as defined in the appended claims. The description is not intended to and should not be construed to limit the present invention of otherwise exclude any such other examples, adaptations, variations, modifications, and equivalent arrangements which are apparent from or reasonably suggested by the present disclosure and description thereof.

The invention claimed is:

1. A ditch check system comprising:
at least one compression tube having an elongate length and an exterior surface;
a front water seal connected to a bottom portion of the exterior surface of the at least one compression tube, the front water seal extending along at least the elongate length of the at least one compression tube and extending outwardly from the at least one compression tube to a proximal edge and to a distal edge;
a rear scour guard having a proximal edge connected to the proximal edge of the front water seal and extending rearwardly from the front water seal to a distal edge; and
a plurality of compression stakes, each compression stake having an elongate stake portion configured to penetrate into and through the at least one compression tube and into a portion of the front water seal and soil therebelow, and a compression pin extending through the compression stake substantially perpendicular to an axis of the elongate stake portion and positioned adjacent a proximal end portion of the elongate stake portion, the plurality of compression stakes being positionable at spaced locations along an upper portion of the at least one compression tube and configured to apply a downward compressive force onto the at least one compression tube sufficient to resist migration of the at least one compression tube upon impact of storm water thereagainst.

2. The ditch check system of claim 1, wherein the front water seal, rear scour guard, and the at least one compression tube comprise a pre-fabricated unit.

3. The ditch check system of claim 1, wherein the exterior surface of the at least one compression tube comprises a water permeable material.

4. The ditch check system of claim 1, wherein the at least one compression tube defines an interior volume configured to be substantially filled with a filler material.

5. The ditch check system of claim 1, further comprising a plurality of staples, the plurality of staples configured to pin portions of the front water seal and portions of the rear scour guard to the soil therebelow.

6. The ditch check system of claim 1, further comprising at least one vertically extending sheet of a water-permeable material integrated with the front water seal, rear scour guard, and at least one compression tube, the at least one vertically extending sheet configured to substantially filter sediment and debris displaced by storm water.

7. The ditch check system of claim 6, wherein the at least one vertically extending sheet comprises a plurality of release stages configured to allow flow rates of the storm water therethrough.

8. A ditch check system comprising:
- at least one vertically extending sheet of a water-permeable material configured to substantially filter sediment and debris displaced by storm water;
- at least one compression tube having an elongate length and an exterior surface;
- a front water seal having a proximal edge connected to a bottom portion of the exterior surface of the at least one compression tube, the front water seal extending at least the elongate length of the at least one compression tube and outwardly to a distal edge;
- a rear scour guard coupled to the front water seal and extending rearwardly from the front water seal to a distal edge;
- wherein the at least one vertically extending sheet of a water-permeable material is integrated with the front water seal, rear scour guard, and at least one compression tube; and
- a plurality of compression stakes, each compression stake having an elongate stake portion configured to penetrate into and through the at least one compression tube and into a portion of soil therebelow and a compression pin extending normal to a proximal end portion of the elongate stake portion, the plurality of compression stakes being positionable at spaced locations along an upper portion of the at least one compression tube and configured to apply a downward compressive force onto the at least one compression tube sufficient to resist migration of the at least one compression tube upon impact of storm water thereagainst.

9. The ditch check system of claim 8, wherein the front water seal, rear scour guard, and the at least one compression tube comprise a pre-fabricated unit.

10. The ditch check system of claim 8, wherein the exterior surface of the at least one compression tube comprises a water permeable material.

11. The ditch check system of claim 8, wherein the at least one compression tube defines an interior volume configured to be substantially filled with a filler material.

12. The ditch check system of claim 8, further comprising a plurality of staples, the plurality of staples configured to pin portions of the front water seal and portions of the rear scour guard to the soil therebelow.

13. The ditch check system of claim 8, wherein the at least one vertically extending sheet comprises a plurality of release stages configured to allow flow rates of the storm water therethrough.

* * * * *